US007111937B2

(12) United States Patent
Landgrave et al.

(10) Patent No.: US 7,111,937 B2
(45) Date of Patent: Sep. 26, 2006

(54) SPECTACLE LENSES INCORPORATING ATORIC SURFACES

(75) Inventors: Enrique Landgrave, León (MX); Antonio Villalobos, Ensenada (MX); Criseida González, Ensenada (MX)

(73) Assignee: Augen Opticos SA de CV, Baja California (MX)

( * ) Notice: Subject to any disclaimer, the term of this patent is extended or adjusted under 35 U.S.C. 154(b) by 0 days.

(21) Appl. No.: 11/015,081

(22) Filed: Dec. 16, 2004

(65) Prior Publication Data

US 2006/0132708 A1    Jun. 22, 2006

(51) Int. Cl.
G02C 7/02    (2006.01)
(52) U.S. Cl. ...................... 351/177; 351/176
(58) Field of Classification Search ............... 351/176, 351/177
See application file for complete search history.

(56) References Cited

U.S. PATENT DOCUMENTS

| 3,960,442 A | 6/1976 | Davis et al. |
| 4,613,217 A | 9/1986 | Fuerter et al. |
| 5,038,859 A | 8/1991 | Lynde et al. |
| 5,767,939 A | 6/1998 | Komatsu et al. |
| 6,305,800 B1 | 10/2001 | Miller et al. |

OTHER PUBLICATIONS

Stuik, D. J., Classical Differential Geometry, 1988, Dover, New York, pp. 76-83.
Piegl, L and Tiller, W., The Nurbs Book, 2$^{nd}$ ed., 1998, Springer, Berlin.
Landgrave, J.E.A. and Moya-Cessa, J.R., Generalized Coddington Equation in Ophthalmic Lens Design, Journal of the Optical Society of America; vol. 13, No. 8, pp. 1637-1644, Aug. 1996.
Hayford, M.J., Optimization Methodology, Proceedings of SPIE Vo. 531, Geometrical Optics, 1985.
Sloan, L.L., Measurement of Visual acuity: A critical review; A.M.A. Archives of ophtalmology, vol. 45, No. 6; pp. 704-725; Jun. 1951.

*Primary Examiner*—Scott J. Sugarman
*Assistant Examiner*—Darryl J. Collins
(74) *Attorney, Agent, or Firm*—Skadden, Arps, Slate, Meagher & Flom LLP

(57)    ABSTRACT

An atoric surface is formed such that the surface coordinate lines are parallels with the shape of off-set curves of the trajectory curve of a swept surface, and meridians with the shape of the section curve of such swept surface. The lines of curvature of the surface coincide with the coordinate lines, so that the surface cylinder axis at any point P of the atoric surface is tangent to one of the two coordinate lines that passes through P. Atoric surfaces with lines of curvature in the form of meridian and parallel curves are highly suitable for astigmatic surfaces in spectacle lens design. The atoric surface design methodology provided herein is used to generate a broad range of surfaces from this class, thereby providing substantial flexibility over prior methods.

45 Claims, 6 Drawing Sheets

SPECTACLE LENSES INCORPORATING ATORIC SURFACES

FIELD OF THE INVENTION

The present invention relates to astigmatic spectacle lenses. More specifically, the invention relates to forming atoric lens surfaces which provide cost effective and efficient solution to astigmatic spectacle lens manufacturers.

BACKGROUND OF THE INVENTION

The design of spectacle lenses has several, often conflicting, considerations. These considerations can be grouped as optical, ergonomic, cosmetic, and economic. Presently available spectacle lens consists of a single refractive element which is a transparent homogeneous material bounded by two polished surfaces, usually in the form of a meniscus. Therefore, to design spectacle lenses that offer a suitable compromise in terms of the above considerations, the designer refers to two main elements: 1) the optical and physical properties of the lens material, which consist of the refractive index, the constringence (Abbe number), and the density and 2) the geometry of the surfaces that bound the lens.

Until recently, the lack of appropriate optical machinery restricted the milling and polishing of optical surfaces to spherical and toric shapes. With the advent of Computerized Numerical Control (CNC) machines, the manufacturing of complex optical surfaces, the so-called free-form surfaces, became feasible, creating new possibilities in spectacle lens design.

Also recently, plastic materials with relatively high refractive indexes and moderately low Abbe numbers were produced, making possible the designs of lighter, flatter (small plate-thickness) and thinner (small edge or center thickness) lenses, without sacrificing optical performance.

A shortcoming of astigmatic lenses made with spherical and toric surfaces is the inability to simultaneously correct the mean power error and the astigmatic error in the two main meridians of the lens, namely, the base curve meridian and the cross curve meridian. The use of aspherical surfaces, that is, of non-spherical surfaces of revolution, does not solve the problem.

SUMMARY OF THE INVENTION

Therefore, in accordance with the invention, an atoric surface is provided as a swept surface, which is generated by sweeping a plane symmetrical section curve along a plane symmetrical trajectory curve. This surface allows for the simultaneous correction of the mean power error and the astigmatic error in the two main meridians of the lens. In one embodiment directed to single vision lenses the front surface, the ocular surface or both surfaces of the lens are atoric. For multifocal lenses, including progressive addition lenses, the ocular surface of the lens is atoric. The full description of the section curve and the trajectory curve of an atoric surface of the lens is attained by minimizing the optical aberrations in the optically useful area of the spectacle lens, which comprises all directions of sight up to at least 30°, measured from the natural direction of sight. For the purpose of minimization, the section curve and the trajectory curve of an atoric surface of the invention are defined with conic sections plus deformation terms, with polynomials, or more generally, with splines. The benefits of the present invention are particularly noticeable in spectacle lenses with cylinder graduations beyond −1.00 diopters.

DESCRIPTION OF THE INVENTION

Figure 1:
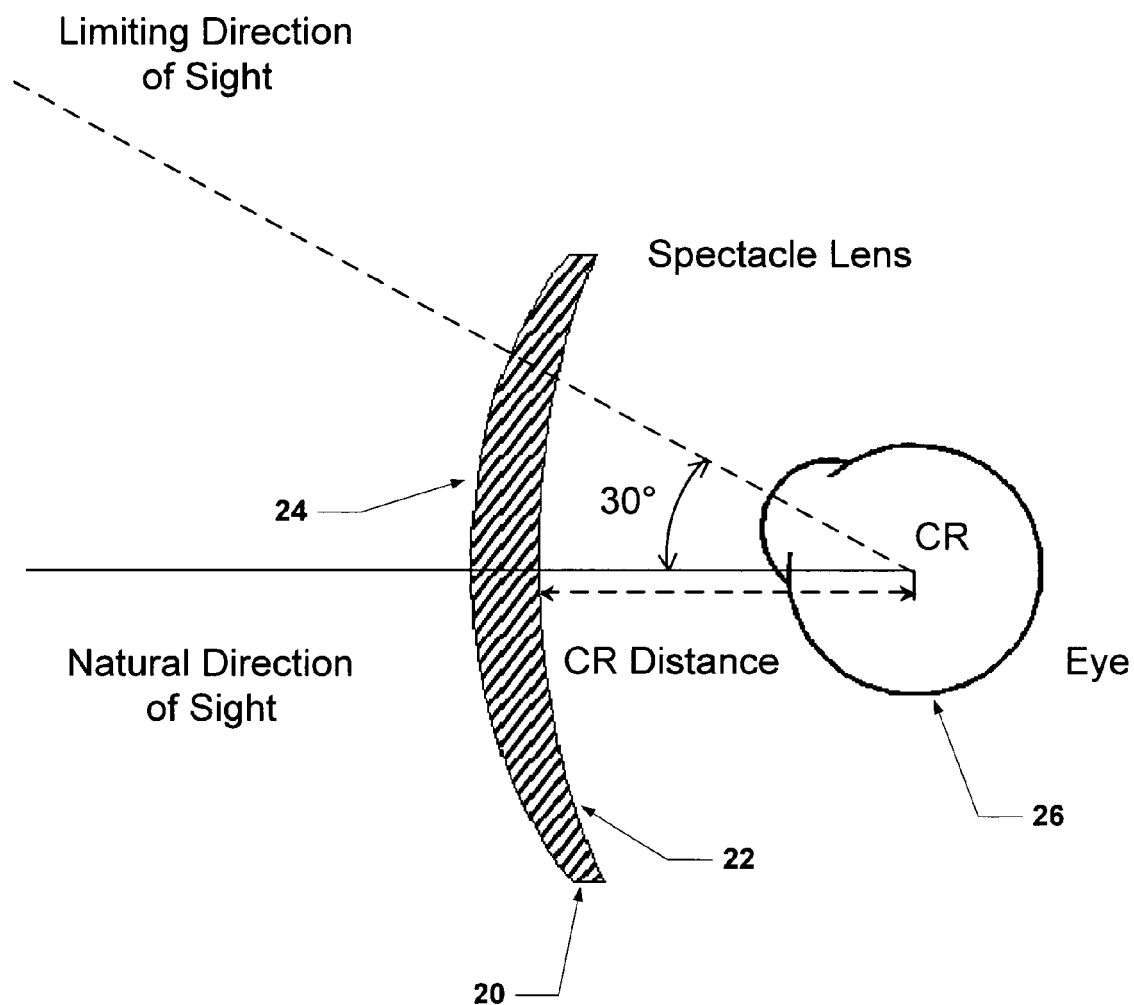
FIG. 1 illustrates a vertical section of a spectacle-lens/eye system of the invention.
Figure 2A:
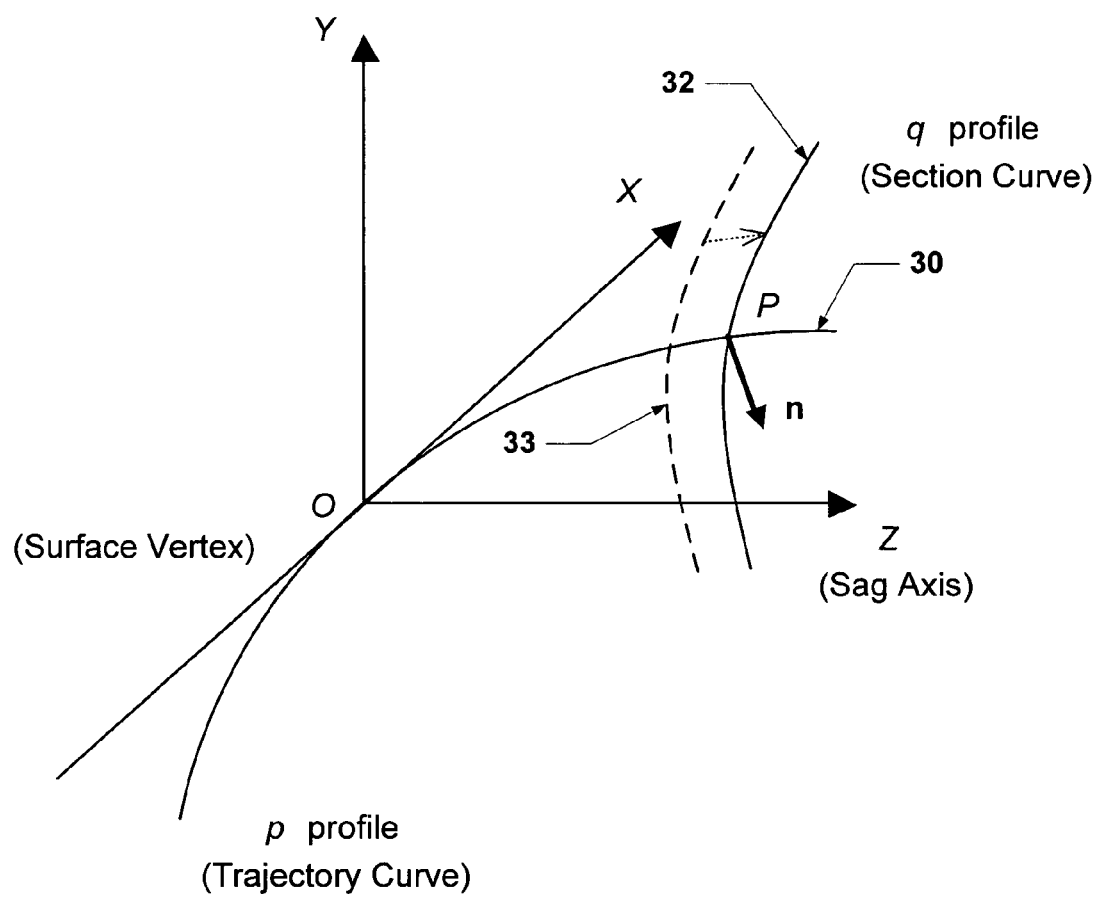
FIGS. 2($a$) and 2($b$) illustrate the section curve and the trajectory curve in the two kinds of atoric surfaces that can be generated with two given plane symmetrical curves.
Figure 2B:
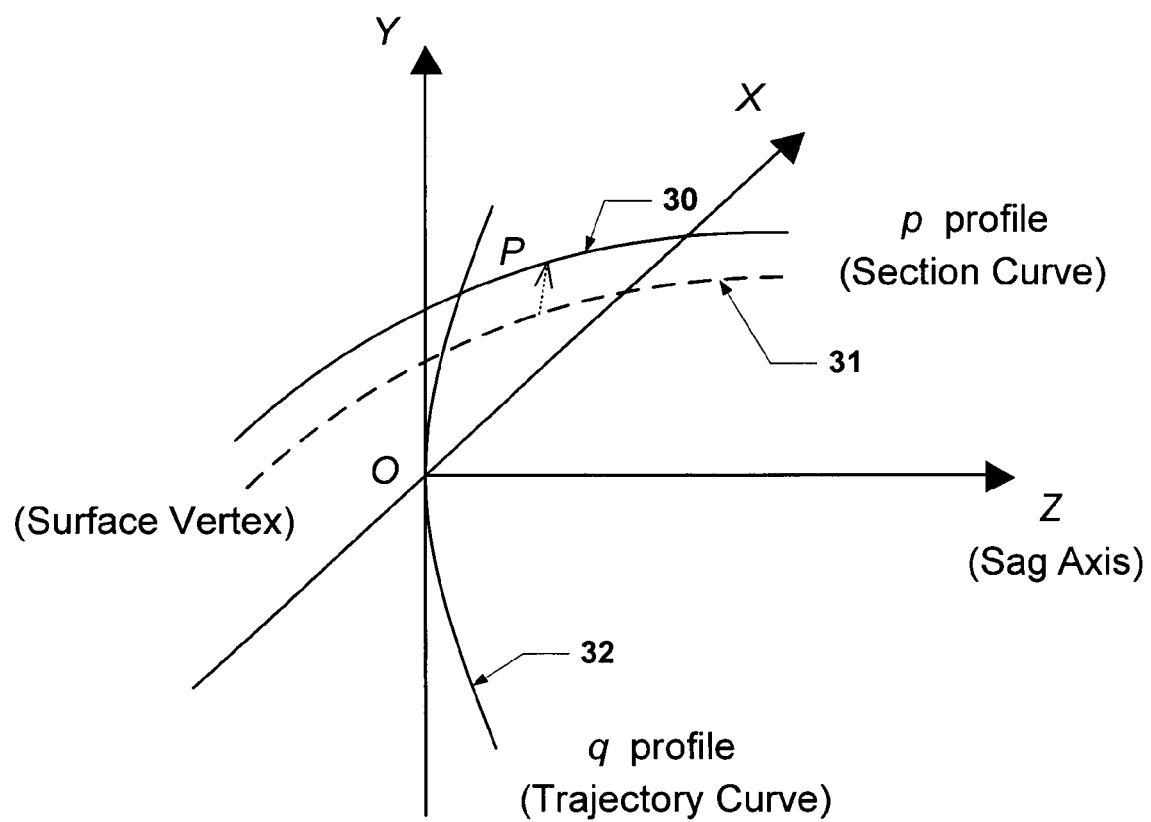

The present invention relates to astigmatic spectacle lenses, which incorporate atoric surfaces for a substantial correction of the mean power and the astigmatic error in all directions of sight up to at least 30°, measured from the natural direction of sight. The aberrations of the spectacle lens should be corrected for all directions of sight up to the limit shown in FIG. 1. The atoric surfaces used for this purpose are swept surfaces, defined by a plane symmetrical section curve and a plane symmetrical trajectory curve. In this discussion the trajectory curve is referred to as "the p profile" and the section curve is referred to as "the q profile". These profiles are illustrated in FIG. 2($a$). Preferably, the p profile is the base curve meridian of the atoric surface and the q profile is the cross curve meridian of the atoric surface. In another embodiment, the p profile is the section curve, and the q profile is the trajectory curve, as is illustrated in FIG. 2($b$). The atoric surfaces of FIGS. 2($a$) and 2($b$) can be thought of as the equivalents of the tire and the barrel types of conventional toric surfaces, respectively. As may be appreciated, both atoric surfaces would reduce to their toric counterparts if their p and q profiles were circular arcs.

In FIG. 2($a$), the q profile is swept along the p profile in such a way that, at any point P of the p profile 1) the vertex of the q profile lies at P, 2) the inward unit normal vector at the vertex of the q profile coincides with the inward unit normal vector at the point P of the p profile, and 3) the plane of the q profile is perpendicular to the plane of the p profile.

Figure 3:
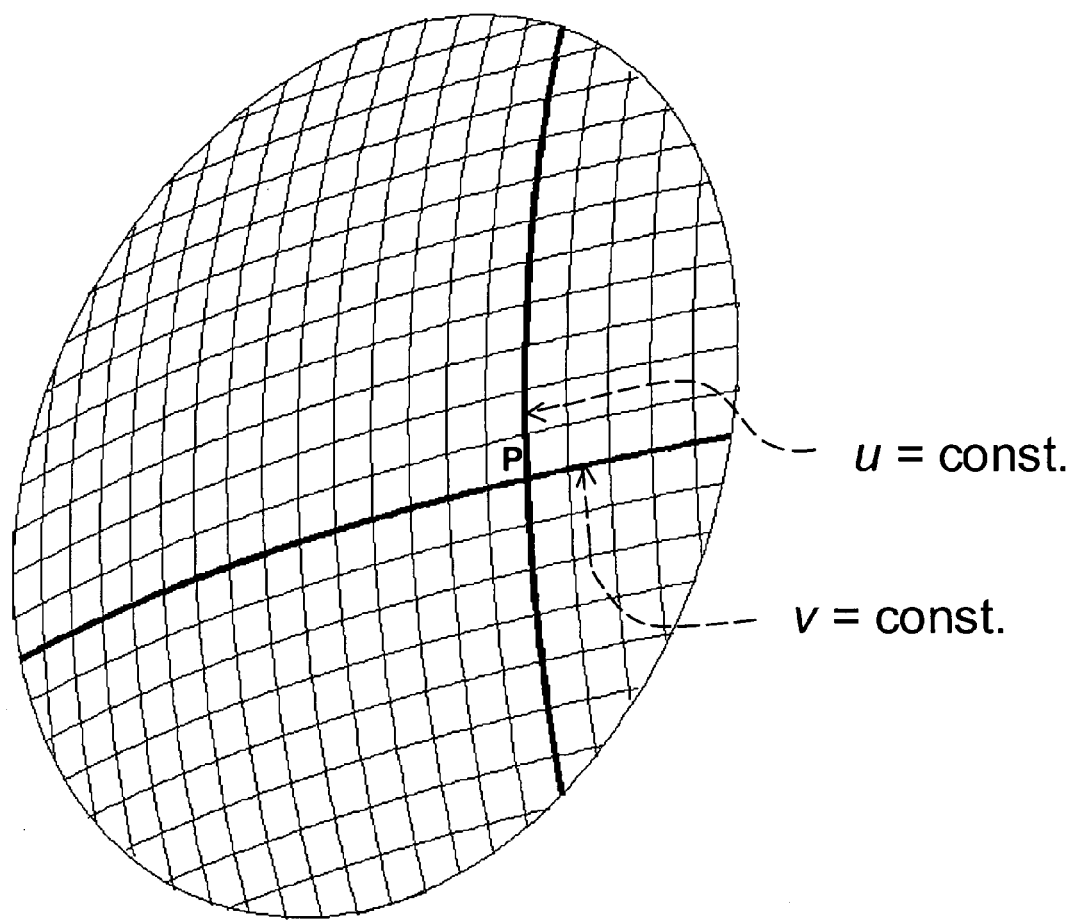
FIG. 3 illustrates the orthogonal system of curves which form the coordinate lines of an atoric surface in the present invention.

The atoric surface of the present invention is formed such that the surface coordinate lines are parallels with the shape of off-set curves of the trajectory curve, and meridians with the shape of the section curve, as illustrated in FIG. 3. In this example, the curves v=constant are parallels, and the curves u=constant are meridians. The lines of curvature of the surface coincide with the coordinate lines, so that the surface cylinder axis at any point P of the atoric surface is tangent to one of the two coordinate lines that passes through P. Thus, in the atoric surfaces of the invention, the orientation of the local cylinder axis on the surface is similar to the orientation of these axes in the classical toric surface. Atoric surfaces with lines of curvature in the form of meridian and parallel curves are highly suitable for astigmatic surfaces in spectacle lens design. The atoric surface of the present invention is the most general kind of such class of surfaces, providing substantial flexibility over prior methods.

To optimize the optical performance of the lens, the designer adjusts the shape of the p and q profiles. Although these adjustments can be made with a small number of parameters, the parameters provide enough flexibility for correcting the relevant optical aberrations of the lens for all directions of sight. Unlike the atoric surface of Davis et al. (U.S. Pat. No. 3,960,442) and the classical toric surface, the expression for the atoric surface in the present invention can not be written in explicit form, that is, in the form z=f(x,y), where x, y and z are Cartesian coordinates, z being the sagita of the surface. Rather, the atoric surface in the invention requires a parametric representation. Assuming that the p profile lies in the xz plane, this representation is:

$$x(u, v) = u + \alpha_p(u) q(v),$$

$$y(u, v) = v,$$

$$z(u, v) = p(u) + \gamma_p(u) q(v). \quad (1)$$

The range of the parameter u in these equations is about the same as that of the coordinate x, and the range of the parameter v is about the same as that of the coordinate y. p(u) and q(v) are functions that describe the p and q profiles. In one embodiment, these functions are obtained from the equation of a conic section plus deformation terms provided as:

$$p(u) = \frac{c_p u^2}{1 + \sqrt{1 - \varepsilon_p c_p^2 u^2}} + a_4 u^4 + a_6 u^6 + a_8 u^8 + a_{10} u^{10}, \quad (2)$$

$$q(v) = \frac{c_q v^2}{1 + \sqrt{1 - \varepsilon_p c_q^2 v^2}} + b_4 v^4 + b_6 v^6 + b_8 v^8 + b_{10} v^{10},$$

where $c_p$ and $c_q$ are, respectively, the vertex curvatures of the p and q profiles, $\epsilon_p$ and $\epsilon_q$ are, respectively, the conic constants of the p and q profiles, $a_4$, $a_6$, $a_8$ and $a_{10}$ are the coefficients of the deformation terms of the p profile, and $b_4$, $b_6$, $b_8$ and $b_{10}$ the coefficients of the deformation terms of the q profile. In other embodiments of the present invention, the p and q profiles of the atoric surface can be defined by means of polynomials, or of spline functions, keeping in mind that these profiles must be symmetrical.

The functions $\alpha_p(u)$ and $\gamma_p(u)$ in equation (1) are the first and third components of the inward unit normal vector at point P of the p profile: $n = (\alpha_p(u), 0, \gamma_p(u))$. By construction $\beta_p(u) = 0$ and $\gamma_p(u) > 0$. (See FIG. 2(a).)

From equation (1) it is clear that the coordinate lines v=const. can be seen as off-set curves of the p profile, with an off-set distance q(v), that have subsequently been placed at the plane y=v. Hence the name of parallels given to these particular coordinate lines; the distance between two of them, measured along the coordinate lines u=constant, is the same, regardless of which of these coordinate lines is used to measure it. The coordinate lines u=constant, on the other hand, have the shape of the q profile.

If F and f are, respectively, the second coefficients of the first and the second fundamental forms of a surface, from equation (1) it may be shown that F=0 and f=0, proving that the coordinate lines of the atoric surface of the present invention are also the lines of curvature of the surface (D. J. Struik, *Lectures in Classical Differential Geometry*). Since the lines of curvature of any surface form a net of orthogonal curves, the coordinate lines u=constant and v=constant of the atoric surface of the invention are, as expected, also orthogonal for all the allowed values of u and v.

The equation for the general swept surface can produce weird, even non-sensical, surfaces (L. Piegl and W. Tiller, *The Nurbs Book*). The particular form of swept surface that is used to generate the atoric surfaces of the present invention is no exception, and the possibility of generating a self-intersecting surface is not remote. This happens when the progression of parallel curves of the atoric surface degenerates into curves that have cusps (focal points) or self-intersections. To avoid this, it is sufficient to restrict the values of the parameter v=y to those values of v that satisfy the inequality $\kappa_{p,max} q(v) < 1$, where $\kappa_{p,max}$ is the maximum curvature of the p profile.

A spectacle lens of the present invention can be a single vision lens with one or both surfaces atoric, with the form prescribed by equation (1). The lens may also be a multifocal lens, including a progressive addition lens, with the atoric surface prescribed by equations (1) as the ocular surface of the lens. To optimize the optical performance of any of these lenses, the optical aberrations are computed through ray tracing techniques, and in most cases, minimized by means of an optimization algorithm, making use of a suitable merit function. To minimize this merit function, the optimization algorithm would have to adjust the shape of the p and q profiles that generate the atoric surfaces of the lens. For the purpose of computing the optical aberrations, in particular the mean power error and the astigmatic error for different directions of sight, equations in the paper "Generalized Coddington equations in ophthalmic lens design," by J. E. A. Landgrave and J. R. Moya-Cessa, may be employed. In one embodiment of the invention, the Damped Least Squares optimization algorithm, also known as the Levenberg-Marquardt algorithm, is employed ("Optimization Methodology," by M. J. Hayford). In this classical optimization algorithm, a natural merit function for the present invention is $$\phi = \sum_i \left[ w_{cyl}^2 (cyl. \text{ error})^2 + w_{sph}^2 (sph. \text{ error})^2 \right]_i, \quad (3)$$

where $w_{cyl}$ and $w_{sph}$ are the weights assigned to the cylinder (astigmatic) error and the sphere (mean power) error, respectively. Thus, to design a Punktal lens we would set $w_{sph} = 0$, and to design a Percival lens we would set $w_{cyl} = 0$. In practice, the weights are assigned taking into consideration such factors as the impact on visual acuity of a sphere error and a cylinder error, and the allowable reserves in eye accommodation (L. L. Sloan, "Measurement of visual acuity: A critical review.") The summation is for a significant number of cylinder and sphere errors, computed in all directions of sight up to at least 30°, measured from the natural direction of sight.

EXAMPLE IMPLEMENTATION

The following two examples illustrate the degree of aberration correction that can be achieved with spectacle lenses of the present invention. It should be appreciated that these examples are specific embodiments of the invention, and that they do not limit the generality of the invention, as discussed above.

The examples concern two single vision lenses of refractive index n=1.56. These lenses are designed for +3.75 diopters of sphere power and −2.50 diopters of cylinder power, and −4.00 diopters of sphere power and −2.50 diopters of cylinder power. The front surface of the lenses is atoric, and their ocular surfaces is toric. The lenses can be made with conventional optical machinery, from blanks in which the front surface has been molded with the shape of their corresponding atoric surface. These two kinds of blanks can be used to process lenses that have similar graduations to the lenses of the examples, without impairing the optical performance of the new lenses beyond tolerable levels. In other words, the two atoric surfaces of the blanks are used as base surfaces for a lens series, and based on the experience of designing conventional, single vision lens series, the designer selects suitable sphere and cylinder powers for the two atoric surfaces. This means that the vertex curvature of the section curve and the trajectory curve that was chosen for each atoric surface remains constant during the process of minimization of the optical aberrations of each lens.

To design both lenses, the section curve and the trajectory curve of their atoric surface are represented as conic sections plus deformation terms (see equation (2)). A good design is obtained for each lens by setting the coefficients of the deformation terms $a_{2i}=0$ and $b_{2i}=0$, $i=2, 3, 4, 5$, and adjusting afterwards the conic constants $\epsilon_p$ and $\epsilon_q$. In the present case, i.e., single vision lenses having only one atoric surface, this adjustment could be made after a few trials in a ray tracing program with a good graphical user interface, without the need of using an optimization algorithm. Nonetheless, if the aberration correction that is attained in this form needs further improvement, the atoric surfaces that are obtained with the ray tracing program alone are a good starting point for the optimization algorithm. With this representation for the section and the trajectory curves, the optimization algorithm would admit 10 variables: 2 conic constants and 8 coefficients of deformation terms, all of them required to fully specify the atoric surface. Since the sphere and the cylinder power of the atoric surface are fixed in advance, the vertex curvature of the trajectory curve ($c_p$) and the vertex curvature of the section curve ($c_q$) would remain constant during the process of optimization.

Figure 4A:
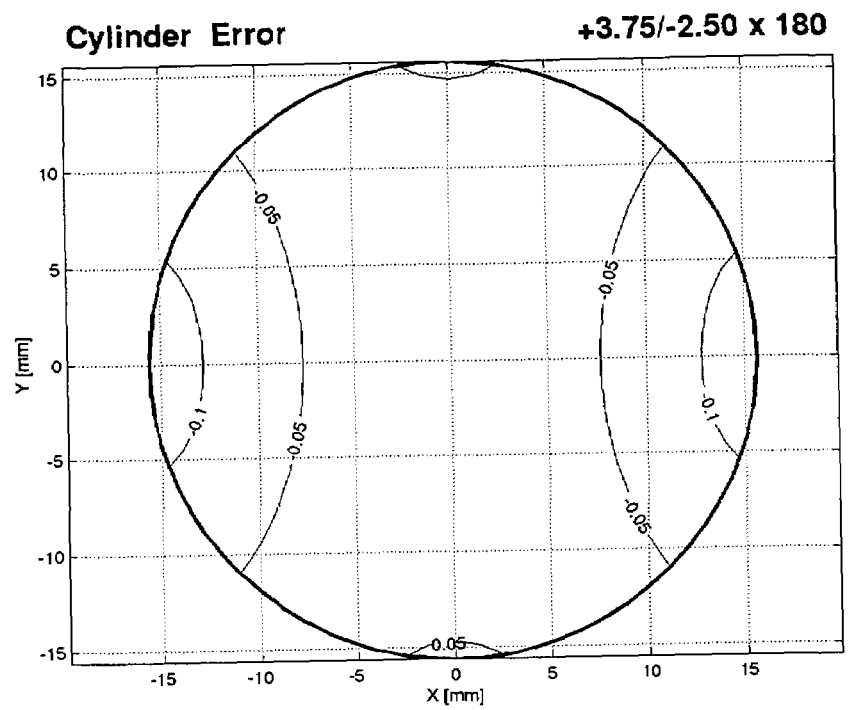
FIGS. 4($a$) and 4($b$) illustrates the cylinder (astigmatic) error map and the sphere (mean power) error map for a +3.75/−2.50 lens designed with an atoric surface of the present invention.
Figure 4B:
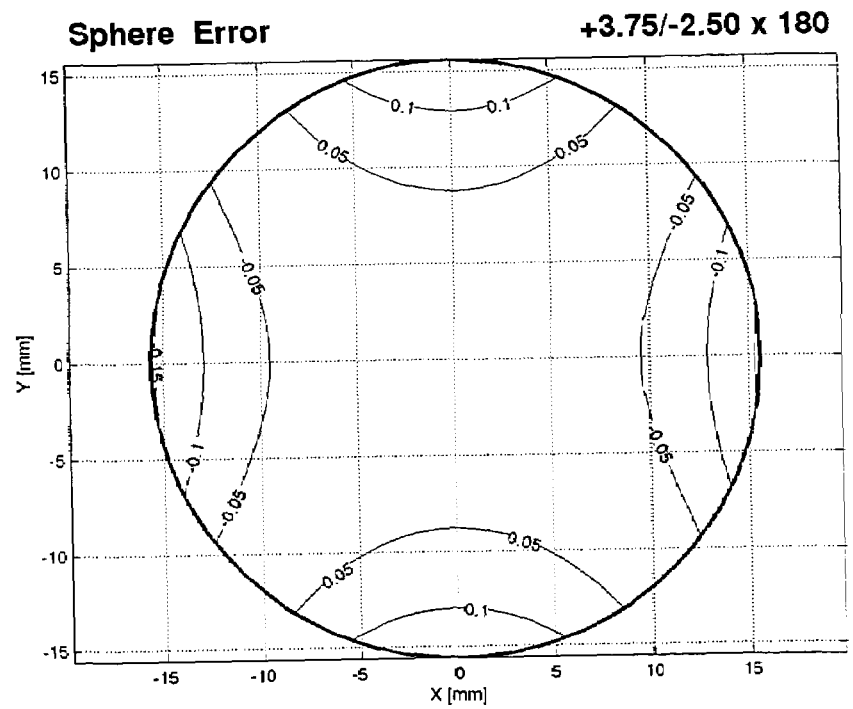

TABLES 1(a) and 1(b) show the atoric surface parameters and the toric surface curvatures for the +3.75/−2.50 lens. The curvatures are in $mm^{-1}$. The diameter of the lens was fixed at 60 mm. For this diameter the central thickness of the lens is 3.91 mm, the maximum edge thickness is 2.88 mm, and the minimum is 1.00 mm. FIGS. 4(a) and 4(b) show the cylinder (astigmatic) error and the sphere (mean power) error maps for this lens, with contour lines in steps of 0.05 diopters. The dimensions of the corrected area of the lens were computed assuming a distance of 27 mm from the back vertex of the lens to the center of rotation of the eye.

TABLE 1(a)

+3.75/−2.50 Lens
Front Surface
Atoric Surface Parameters

| p profile | q profile |
|---|---|
| $c_p = 0.0121698$ | $c_q = 0.0115094$ |
| $\epsilon_p = 0.07$ | $\epsilon_q = 1.20$ |
| $a_{2i} = 0.00$ | $b_{2i} = 0.00$ |

$i = 2, 3, 4, 5$

TABLE 1(b)

+3.75/−2.50 Lens
Ocular Surface
Toric Surface Curvatures

| Base Curve | Cross curve |
|---|---|
| $c_x = 0.0056850$ | $c_y = 0.0094664$ |

Figure 5A:
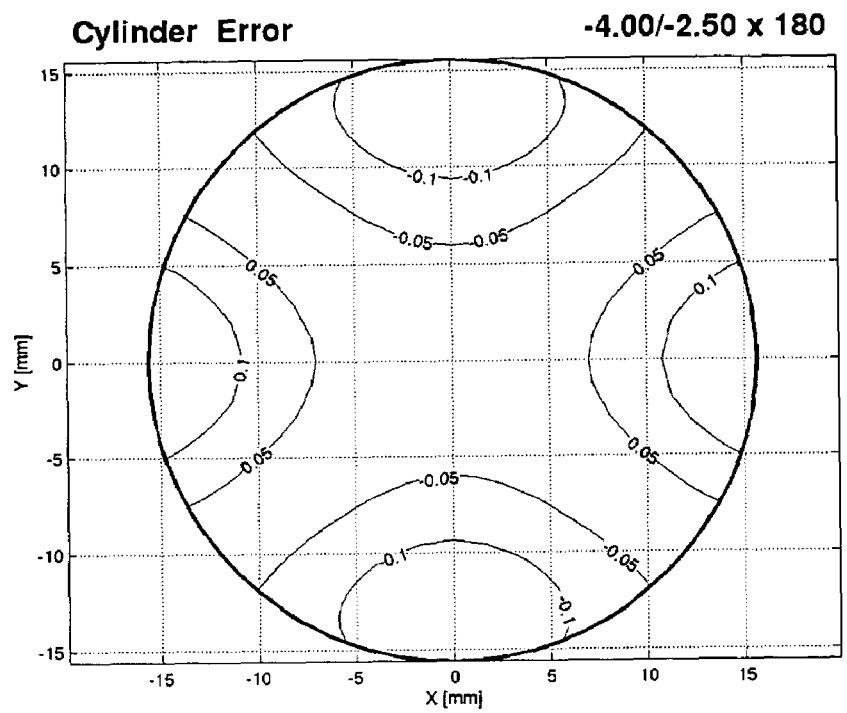
FIGS. 5($a$) and 5($b$) show the corresponding error maps for a −4.00/−2.50 lens of the present invention.
Figure 5B:
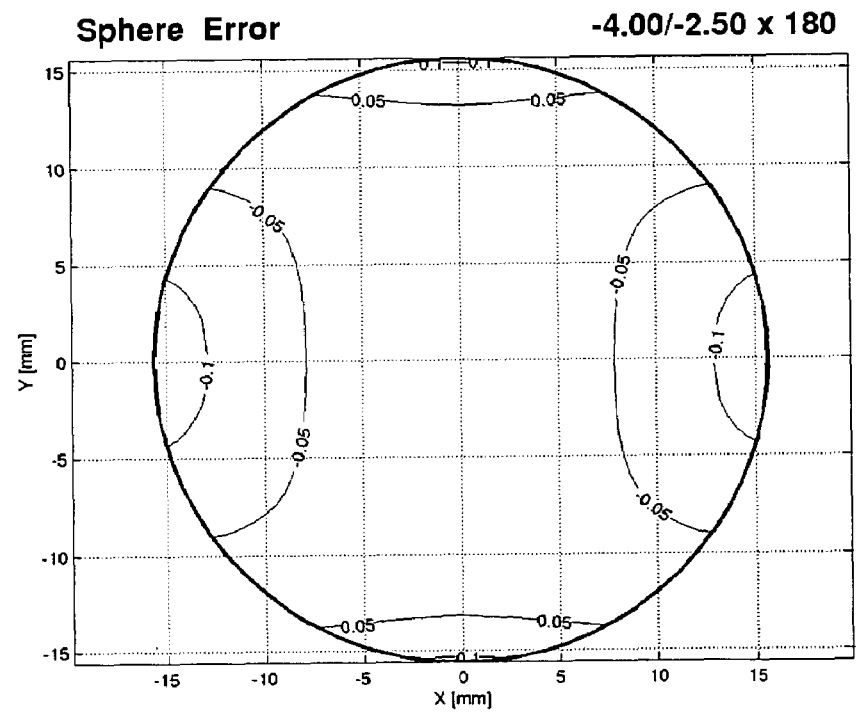

TABLES 2(a) and 2(b) disclose atoric surface parameters and the toric surface curvatures for the −4.00/−2.50 lens. The curvatures are in $mm^{-1}$. The diameter of the lens was fixed at 60 mm, and the central thickness was fixed at 1.00 mm. For this diameter and this central thickness, the maximum edge thickness is 6.48 mm and the minimum is 4.30 mm. FIGS. 5(a) and 5(b) show the cylinder (astigmatic) error and the sphere (mean power) error maps for this lens, with contour lines in steps of 0.05 diopters. The dimensions of the corrected area of the lens are plotted assuming a distance of 27 mm from the back vertex of the lens to the center of rotation of the eye.

TABLE 2(a)

−4.00/−2.50 Lens
Front Surface
Atoric Surface Parameters

| p profile | q profile |
|---|---|
| $c_p = 0.0042453$ | $c_q = 0.0035849$ |
| $\epsilon_p = 9.00$ | $\epsilon_q = 26.00$ |
| $a_{2i} = 0.00$ | $b_{2i} = 0.00$ |

$i = 2, 3, 4, 5$

TABLE 2(b)

−4.00/−2.50 Lens
Ocular Surface
Toric Surface Curvatures

| Base Curve | Cross curve |
|---|---|
| $c_x = 0.0113946$ | $c_y = 0.0151967$ |

It should be remarked here that the cylinder power in the front surface of the atoric lenses of the examples had a beneficial cosmetic effect, given that the plate thickness of both lenses is less than it would had been if the choice of sphere power for their front surface had been the same, but the choice of cylinder power had been zero.

The refractive index of the lenses is n=1.56, and the distance from the back vertex of the lenses to the center of rotation of the eye is d=27 mm. The cylinder power of the lenses is split between the front surface and the ocular surface. The front surface is the atoric surface. The ocular surface is assumed toric. The lenses, therefore, can be made with conventional optical machinery from a semi-finished lens in which the front surface has been molded with the shape of the atoric surface.

Although the present invention was discussed in terms of certain preferred embodiments, the invention is not limited to such embodiments. A person of ordinary skill in the art will appreciate that numerous variations and combinations of the features set forth above can be utilized without departing from the present invention as set forth in the claims. Thus, the scope of the invention should not be limited by the preceding description, but should be ascertained by reference to claims that follow.

The invention claimed is:

1. A method for forming an astigmatic atoric lens with a homogeneous optical material, comprising:
   producing at least one optical surface of said lens with the shape of an atoric surface, said atoric surface being a swept surface, generated by sweeping a plane symmetrical section curve along a plane symmetrical trajectory curve, so that at any point P of said trajectory curve:
   a) the vertex of the section curve lies at P;
   b) the inward unit normal vector at the vertex of the section curve coincides with the inward unit normal vector at the point P of the trajectory curve; and
   c) the plane in which lies the section curve is perpendicular to the plane in which lies the trajectory curve, wherein the trajectory curve of said at least one atoric surface of the lens is the equatorial curve meridian, and the section curve of said atoric surface of the lens is the transverse curve meridian.

2. A method for forming an astigmatic atoric lens with a homogeneous optical material, comprising:
   producing at least one optical surface of said lens with the shape of an atoric surface, said atoric surface being a swept surface, generated by sweeping a plane symmetrical section curve along a plane symmetrical trajectory curve, so that at any point P of said trajectory curve:
   a) the vertex of the section curve lies at P;
   b) the inward unit normal vector at the vertex of the section curve coincides with the inward unit normal vector at the point P of the trajectory curve; and
   c) the plane in which lies the section curve is perpendicular to the plane in which lies the trajectory curve, wherein the trajectory curve of said at least one atoric surface of the lens is the transverse curve meridian, and the section curve of said atoric surface of the lens is the equatorial curve meridian.

3. A method for forming an astigmatic atoric lens with a homogeneous optical material, comprising:
   producing at least one optical surface of said lens with the shape of an atoric surface, said atoric surface being a swept surface, generated by sweeping a plane symmetrical section curve along a plane symmetrical trajectory curve, so that at any point P of said trajectory curve:
   a) the vertex of the section curve lies at P;
   b) the inward unit normal vector at the vertex of the section curve coincides with the inward unit normal vector at the point P of the trajectory curve; and
   c) the plane in which lies the section curve is perpendicular to the plane in which lies the trajectory curve, wherein the trajectory curve and the section curve of the atoric surfaces in the lens are defined in the form of conic sections plus deformation terms.

4. A method for forming an astigmatic atoric lens with a homogeneous optical material, comprising:
   producing at least one optical surface of said lens with the shape of an atoric surface, said atoric surface being a swept surface, generated by sweeping a plane symmetrical section curve along a plane symmetrical trajectory curve, so that at any point P of said trajectory curve:
   a) the vertex of the section curve lies at P;
   b) the inward unit normal vector at the vertex of the section curve coincides with the inward unit normal vector at the point P of the trajectory curve; and
   c) the plane in which lies the section curve is perpendicular to the plane in which lies the trajectory curve, wherein the trajectory curve and the section curve of the atoric surfaces in the lens are defined in the form of polynomials.

5. A method for forming an astigmatic atoric lens with a homogeneous optical material, comprising:
   producing at least one optical surface of said lens with the shape of an atoric surface, said atoric surface being a swept surface, generated by sweeping a plane symmetrical section curve along a plane symmetrical trajectory curve, so that at any point P of said trajectory curve:
   a) the vertex of the section curve lies at P;
   b) the inward unit normal vector at the vertex of the section curve coincides with the inward unit normal vector at the point P of the trajectory curve; and
   c) the plane in which lies the section curve is perpendicular to the plane in which lies the trajectory curve, wherein the trajectory curve and the section curve of the atoric surfaces in the lens are defined in the form of splines.

6. A method for forming an astigmatic atoric lens with a homogeneous optical material, comprising:
   producing at least one optical surface of said lens with the shape of an atoric surface, said atoric surface being a swept surface, generated by sweeping a plane symmetrical section curve along a plane symmetrical trajectory curve, so that at any point P of said trajectory curve:
   a) the vertex of the section curve lies at P;
   b) the inward unit normal vector at the vertex of the section curve coincides with the inward unit normal vector at the point P of the trajectory curve; and
   c) the plane in which lies the section curve is perpendicular to the plane in which lies the trajectory curve, wherein the front surface of the lens is atoric.

7. A method for forming an astigmatic atoric lens with a homogeneous optical material, comprising:
   producing at least one optical surface of said lens with the shape of an atoric surface, said atoric surface being a swept surface, generated by sweeping a plane symmetrical section curve along a plane symmetrical trajectory curve, so that at any point P of said trajectory curve:
   a) the vertex of the section curve lies at P;
   b) the inward unit normal vector at the vertex of the section curve coincides with the inward unit normal vector at the point P of the trajectory curve; and
   c) the plane in which lies the section curve is perpendicular to the plane in which lies the trajectory curve, wherein the ocular surface of the lens is atoric.

8. A method for forming an astigmatic atoric lens with a homogeneous optical material, comprising:
   producing at least one optical surface of said lens with the shape of an atoric surface, said atoric surface being a swept surface, generated by sweeping a plane symmetrical section curve along a plane symmetrical trajectory curve, so that at any point P of said trajectory curve:

a) the vertex of the section curve lies at P;
b) the inward unit normal vector at the vertex of the section curve coincides with the inward unit normal vector at the point P of the trajectory curve; and
c) the plane in which lies the section curve is perpendicular to the plane in which lies the trajectory curve, wherein both surfaces of the lens are atoric.

9. A method for forming an astigmatic atoric lens with a homogeneous optical material, comprising:
producing at least one optical surface of said lens with the shape of an atoric surface, said atoric surface being a swept surface, generated by sweeping a plane symmetrical section curve along a plane symmetrical trajectory curve, so that at any point P of said trajectory curve:
a) the vertex of the section curve lies at P;
b) the inward unit normal vector at the vertex of the section curve coincides with the inward unit normal vector at the point P of the trajectory curve;
c) the plane in which lies the section curve is perpendicular to the plane in which lies the trajectory curve; and
minimizing to tolerable levels the relevant optical aberrations of the atoric lens, such as the mean power error and the astigmatic error, for all directions of sight up to at least 30°, measured from the natural direction of sight, by adjusting the shape of the trajectory curve and the shape of the section curve for all atoric surfaces of said atoric lens.

10. The method of claim 9, wherein the optical aberrations of the atoric lens are minimized with a Damped Least Squares optimization algorithm, in which a merit function is the weighted sum of the squares of the relevant optical aberrations of said lens, such as the mean power error and the astigmatic error, said aberrations corresponding to a sufficiently large number of uniformly distributed directions of sight, with angles up to at least 30°, measured from the natural direction of sight.

11. The method of claim 10, wherein at least one surface of the lens is shaped by a molding surface in a casting process.

12. The method of claim 11, wherein the molding surface is an atoric surface of the invention, milled and polished on an ophthalmic glass.

13. The method of claim 12, wherein the atoric molding surface is concave.

14. The method of claim 12, wherein the atoric molding surface is convex.

15. The method of claim 10, wherein the method provides two single vision lenses with spherical power in the range from about −12.00 diopters to about +8.00 diopters, and cylindrical power in the range from about −0.25 diopters to about −4.00 diopters.

16. The method of claim 15, wherein the optical material of the lenses is a polymer, and both, the front and the ocular, surfaces of the lenses are shaped by a molding process.

17. The method of claim 16, wherein the front surface of the lenses is an atoric surface of the invention and the ocular surface of the lenses is a spherical surface.

18. The method of claim 16, wherein the front surface of the lenses is an atoric surface of the invention and the ocular surface of the lenses is a conventional toric surface.

19. The method of claim 16, wherein the front surface of the lenses is an atoric surface of the invention and the ocular surface of the lenses is an aspherical surface.

20. The method of claim 16, wherein the front surface of the lenses is a spherical surface and the ocular surface of the lenses is an atoric surface of the invention.

21. The method of claim 16, wherein the front surface of the lenses is a conventional toric surface and the ocular surface of the lenses is an atoric surface of the invention.

22. The method of claim 16, wherein the front surface of the lenses is an aspherical surface and the ocular surface of the lenses is an atoric surface of the invention.

23. The method of claim 16, wherein both, the front and the ocular, surfaces of the lenses are atoric surfaces of the invention.

24. The method of claim 15, wherein the optical material of the lenses is a polymer, the front surface of the lenses is shaped by a molding process, and the ocular surface of the lenses is milled and polished to satisfy an ophthalmic prescription in terms of spherical power, cylindrical power and cylinder axis orientation, and to minimize the relevant optical aberrations of the lenses, such as the mean power error and the astigmatic error, for all directions of sight up to at least 30°, measured from the natural direction of sight.

25. The method of claim 24, wherein the front surface of the lenses is an atoric surface of the invention and the ocular surface of the lenses is a spherical surface.

26. The method of claim 24, wherein the front surface of the lenses is an atoric surface of the invention and the ocular surface of the lenses is a conventional toric surface.

27. The method of claim 24, wherein the front surface of the lenses is an atoric surface of the invention and the ocular surface of the lenses is an aspherical surface.

28. The method of claim 24, wherein the front surface of the lenses is a spherical surface and the ocular surface of the lenses is an atoric surface of the invention.

29. The method of claim 24, wherein the front surface of the lenses is a conventional toric surface and the ocular surface of the lenses is an atoric surface of the invention.

30. The method of claim 24, wherein the front surface of the lenses is an aspherical surface and the ocular surface of the lenses is an atoric surface of the invention.

31. The method of claim 24, wherein both, the front and the ocular, surfaces of the lenses are atoric surfaces of the invention.

32. The method of claim 15, wherein the optical material of the lenses is a polymer, and both, the front and the ocular, surfaces of the lenses are milled and polished.

33. The method of claim 32, wherein the front surface of the lenses is an atoric surface of the invention and the ocular surface of the lenses is a spherical surface.

34. The method of claim 32, wherein the front surface of the lenses is an atoric surface of the invention and the ocular surface of the lenses is a conventional toric surface.

35. The method of claim 32, wherein the front surface of the lenses is an atoric surface of the invention and the ocular surface of the lenses is an aspherical surface.

36. The method of claim 32, wherein the front surface of the lenses is a spherical surface and the ocular surface of the lenses is an atoric surface of the invention.

37. The method of claim 32, wherein the front surface of the lenses is a conventional toric surface and the ocular surface of the lenses is an atoric surface of the invention.

38. The method of claim 32, wherein the front surface of the lenses is an aspherical surface and the ocular surface of the lenses is an atoric surface of the invention.

39. The method of claim 32, wherein both, the front and the ocular, surfaces of the lenses are atoric surfaces of the invention.

40. The method of claim 10, wherein the lens is a bifocal lenses, the front surface of said lenses having a segment for power addition, and the ocular surface of said lenses being an atoric surface of the invention, said atoric surface being adjusted to satisfy an ophthalmic prescription in terms of spherical power, cylindrical power and cylinder axis orientation, and to minimize the relevant optical aberrations of the lenses, such as the mean power error and the astigmatic error, for all directions of sight up to at least 30°, measured from the natural direction of sight.

41. The method of claim 40, wherein the optical material of the lense is a polymer, the front surface of the lense is shaped by a molding process, and the ocular surface of the lense is milled and polished so as to fulfill the adjustments mentioned in said claim.

42. The method of claim 40, wherein the front surface of the lense is a spherical surface with a power addition segment.

43. The method of claim 40, wherein the front surface of the lense is an aspherical surface with a power addition segment.

44. The method of claim 10, wherein the lens is a progressive addition lense, the front surface of said lense being a progressive addition surface, and the ocular surface of said lense being an atoric surface of the invention, said atoric surface being adjusted to satisfy an ophthalmic prescription in terms of spherical power, cylindrical power and cylinder axis orientation, and to minimize the relevant optical aberrations of the lense, such as the mean power error and the astigmatic error, for all directions of sight up to at least 30°, measured from the natural direction of sight.

45. The method of claim 44, wherein the optical material of the lense is a polymer, the front surface of the lense is shaped by a molding process, and the ocular surface of the lense is milled and polished so as to fulfill the adjustments mentioned in said claim.

* * * * *